July 6, 1965  E. J. BARTHOLET  3,193,249
VALVE STRUCTURE
Filed Jan. 26, 1962   3 Sheets-Sheet 1

INVENTOR.
EMIL J. BARTHOLET
BY
Brumbaugh, Free, Graves & Donohue
his ATTORNEYS

July 6, 1965

E. J. BARTHOLET 3,193,249

VALVE STRUCTURE

Filed Jan. 26, 1962

INVENTOR.
EMIL J. BARTHOLET
BY
Brumbaugh, Free, Graves & Donohue
his ATTORNEYS

INVENTOR.
EMIL J. BARTHOLET

United States Patent Office 3,193,249
Patented July 6, 1965

3,193,249
VALVE STRUCTURE
Emil J. Bartholet, Union, N.J., assignor to A. P. Smith Manufacturing Company, East Orange, N.J., a corporation of New Jersey
Filed Jan. 26, 1962, Ser. No. 169,032
9 Claims. (Cl. 251—327)

This invention relates to valve structures and more particularly to an improved disc for a gate valve which provides a fluid tight seal, reduces wear on the valve parts and renders manipulation of the valve easier and more efficient.

In valves of the gate type, one of the primary causes of valve wear is the increased friction resulting from the high contact pressure developed between the valve disc and valve seat during opening and closing. This is especially so in fluid distribution systems where fluid pressures and rates of flow are high.

In conventional valves, the valve seat is usually made in the form of an annular ring having a relatively small surface area, while the valve disc is provided with a matting contact surface, also in the form of an annular ring and of substantially the same dimensions as the surface of the valve seat. The remainder of the disc is recessed so as not to bear upon the seat as the valve is opened and closed. With the valve in the closed portion, the force applied by the fluid is distributed over the entire contact area, but as the valve disc is withdrawn, the contact area is considerably reduced and the entire force of the fluid against the disc is concentrated on a relatively small contact area. The high pressures thus developed account for the costly wear and cutting of valve seats and discs and, furthermore, prevent smooth, easy operation of the valve.

Accordingly, it is the primary object of the present invention to provide an improved valve structure wherein the aforementioned disadvantages are avoided.

A further object of this invention is to provide an improved valve disc for use in a valve of the gate type wherein the pressure between the valve seat and the contact face of the valve disc caused by the flowing fluid remains substantially constant as the disc is moved between opened and closed positions.

Another object of the present invention is to provide an improved valve disc for use with a gate valve wherein the pressure between the seat and the contact face caused by the flowing fluid is substantially uniformly distributed over the area of contact between the valve seat and the contact face of the valve disc.

Briefly, in accordance with the present invention, a valve disc is provided having a contact face so proportioned that the pressure between the seat and the contact face caused by the fluid flowing through the valve remains substantially constant as the disc is moved between opened and closed positions and is substantially uniformly distributed over the area of contact therebetween. The contact face of the valve disc includes a first annular portion which engages the entire annular valve seat when the valve is in the closed position, and additional portions disposed inside and outside of the annular portion for increasing the area of contact with the seat as the valve is opened and closed. At least the outer portions of the contact face are adjacent the annular portion and in the same plane so as to provide a continuous smooth surface.

The lower section of the valve disc, or that portion of the disc that leaves the valve seat last upon opening of the valve, carries the outer additional portions in the form of ears or extensions disposed on opposite sides of the disc. The inner additional portions are elongated and extend generally in the direction of movement of the valve discs. In one embodiment, the inner portions comprise a pair of elongated segments having one of the long sides thereof contiguous with the inner arcuate edge of the annular portion, and the other long edge being substantially straight and intersecting the inner annular edge. In another embodiment, the elongated segment is arranged diametrically across the annular portion in the direction of movement of the valve disc and contiguous with the annular portion at either end. The elongated contact surface thereof may be diamond shaped or wedge shaped, for example.

In all of the embodiments shown, the contact surfaces are proportioned to provide the pressure and pressure distribution required to minimize wear and cutting of the valve parts, even in the most critical area of the valve operation, i.e., when the valve is between about one-quarter to three-quarters open. As will become apparent hereinafter, it is within this range that the relationship of pressures and contact area in the conventional valve are such as to render the wear and cutting effects most pronounced.

The foregoing and other objects, features and advantages of the present invention will become apparent from the following detailed description of preferred embodiments thereof, when taken in conjunction with the accompanying drawings in which:

FIGURES 1 and 2 are elevation and plan cross-sectional views of a valve utilizing the novel valve disc of the present invention, taken along the lines 1—1 and 2—2 respectively;

Figure 1:
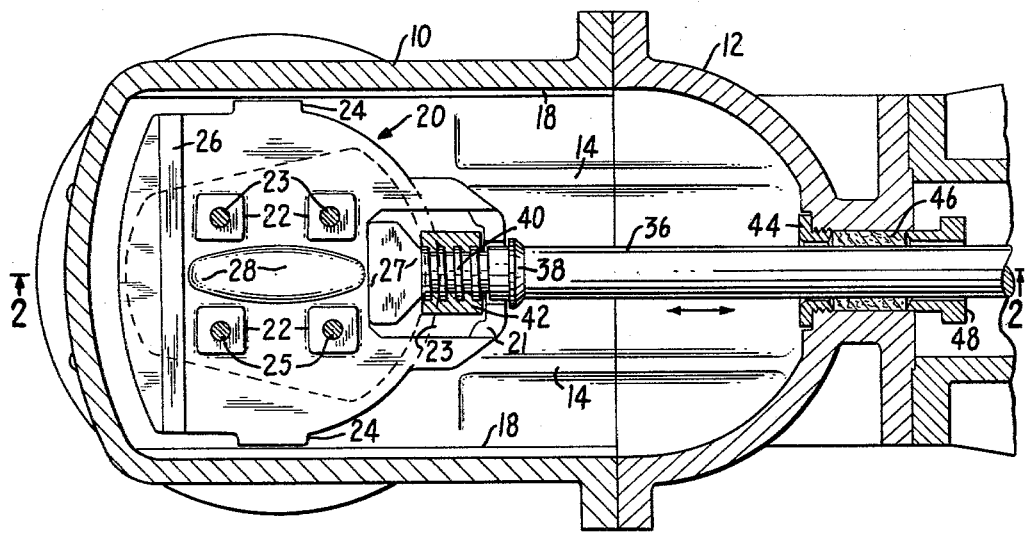
Figure 2:
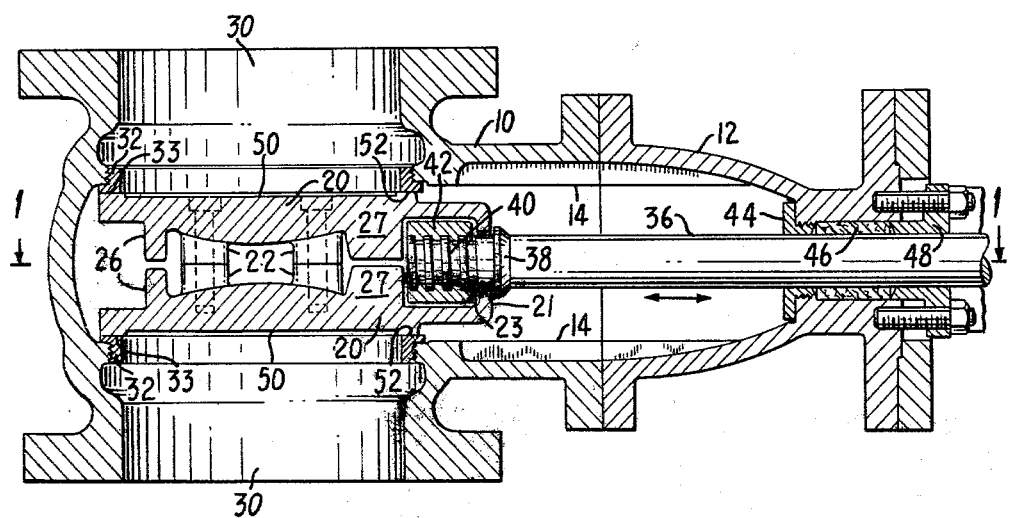

A valve of conventional type in which the valve disc of the present invention may be employed, is illustrated in FIGURES 1 and 2. The details of the valve structure will be described more fully hereinafter, but in general it will be seen as including a pair of back-to-back valve discs 20 having outer surfaces arranged for sealing engagement with respective annular valve seating rings 32, which define the fluid flow opening through the valve. Means including a shaft 36 are provided for sliding the disc or gate assembly between the open and closed positions of the valve.

Figure 3:
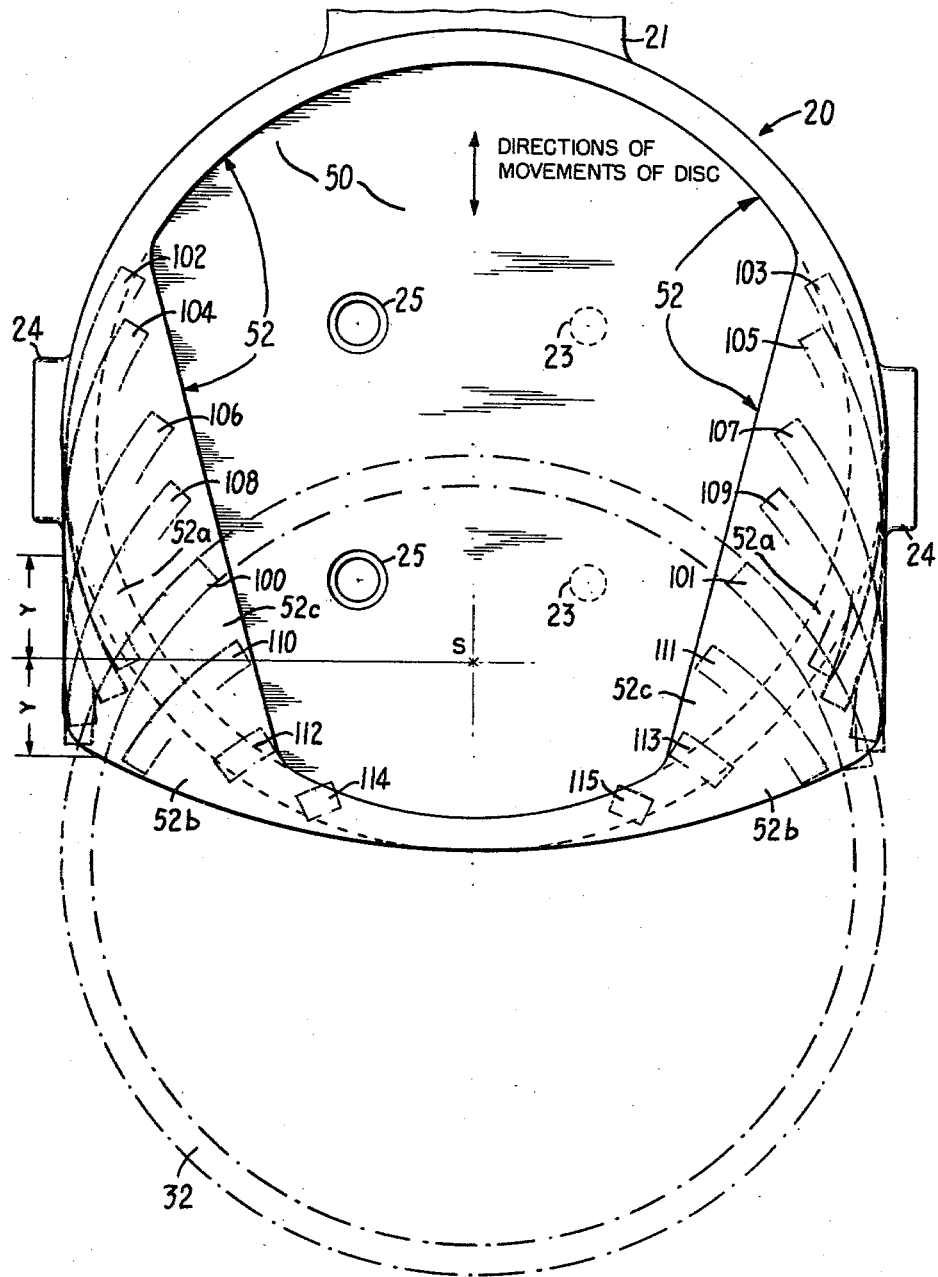
FIGURE 3 is a face view of one form of a valve disc according to the present invention.

Referring now to FIGURE 3, there is shown the outer or sealing face of the valve disc 20 in accordance with one embodiment of the invention. This surface comprises a central depressed portion or recess 50, which does not contact the sealing ring 32, and a raised contact surface indicated generally at 52. For purposes of discussing its configuration, the latter may be considered to be composed of several portions, although in reality the entire contact surface is smooth and continuous.

The first of these portions, 52a, is annular in shape and substantially equal in surface area to the contact surface of the seats 32. With the valve in the closed position, the seat 32 engages the disc 20 over this entire area, indicated by the dotted lines in the figure. The remainder of the contact surface of the disc comprises outer portions 52b on either side thereof, in the form of ears or extensions of the annular portion 52a. Finally, additional portions are located within the annular portion in the form of elongated segments 52c disposed on either side of the inside of the annular portion, generally opposite the outer extensions 52b.

In the embodiment of FIGURE 3, these inner portions 52c are elongated, having their long dimension generally in the direction of movement of the valve disc, indicated by the arrows in the drawing. The outer edges of the respective segments 52c arcuately conform to the curvature of the inner edge of the annular portion and are contiguous therewith over their entire length. The inner elongated edges are substantially straight, intersecting the annular portion at both ends. For reasons which will become apparent hereinafter, these inner straight edges of the inner portions 52c make acute angles with the direction of movement of the disc.

The shape of the contact face 52 of the valve disc may be developed as follows. At a position of the valve disc with respect to the valve seats, indicated by the annular area shown in dot-dash lines and bearing the numeral 32, the area of passage obstruction of the valve disc is determined. As can be seen from the drawing, this area is the portion of the interior opening of the valve seat intercepted by the valve disc. Having determined the area, its center of gravity S is located. Next, the total force acting on the valve disc due to static pressure and fluid flow is determined. Knowing the maximum pressure on the valve seat that will give satisfactory wear conditions, which is dependent upon the materials used in the seats and discs, the total contact area necessary is arrived at by dividing the maximum contact pressure into the total force. The width of the valve seat being known, the total arcuate length of the valve seat to be in contact with the disc face is then easily calculated. To insure that the pressure is uniformly distributed over the contact area, the length of the seat contact area thus computed is divided into two equal segments, 100, 101, one on either side of the vertical axis of the disc, and the segments are disposed equally above and below the center of gravity of the obstruction area. The latter is indicated by the dimensions Y, Y, in the drawings.

The above procedure is repeated for a number (e.g., 7) of positions of the valve disc with respect to the seating ring, and a group of intercepts, 102 to 115, inclusive, developed as shown. A smooth curve approximately through the extremities of the intercepts defines the contact area. To avoid positions where the contact area might be too small to keep the pressure below the allowable maximum, the curve is drawn to intersect or lie beyond all of the extremities. In this way, the contact area is always as large as, or larger than, necessary to keep the pressure within the prescribed limit. In considering the valve disc and its contact area 52, it will be realized that the cost and ease of fabrication will in part determine its configuration, and to this end, simple curves with a minimum of inflection are most desirable. The straight line inner edges of portions 52c and the lower smoothly curved edge of the disc are consistent with both the pressure limitation and fabrication requirements.

Observing this principle, it will be seen that the final shape of the surface 52 closely approximates the computed contact area when the valve is between about one-quarter to three-quarters open, but that the contact area somewhat exceeds the minimum at the extremities of the disc movement. As will be apparent from the foregoing, it is in this range of valve operation that the present invention is of greatest advantage, since below one-quarter open, even the conventional valve provides a reasonable amount of contact area and, beyond three-quarters open, the pressures become so diminished as to lessen the wear problem. In any case, the present invention provides that in every position of the valve disc with respect to the associated valve seat, the contact area is sufficient to maintain the pressure between the surfaces at or below the maximum satisfactory value and substantially equal over the entire contact area.

Figure 4:
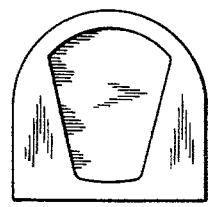
FIGURES 4 and 5 illustrate modifications of the valve disc of FIGURE 3.
Figure 5:
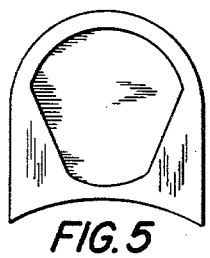

The embodiment of the valve disc shown in FIGURE 3 is provided with a lower edge conforming generally to the left hand or lower end of the valve housing 10. However, it is not necessary that the lower edge be made in this shape and configurations such as shown in FIGURES 4 and 5 may also be used. In FIGURE 4, the lower edge of the valve disc is a substantially straight line while in FIGURE 5 it is curved in a manner opposite to the disc of FIGURE 3, providing more sharply pointed outer portions or ears corresponding to 52b. The area of the inside bearing portions will of course be modified accordingly. In the cases of both FIGURES 4 and 5, the total contact areas of the discs are computed in the manner described in connection with FIGURE 3. It will be apparent that other variations of the contact face and shape may be used as desired.

Figure 6:
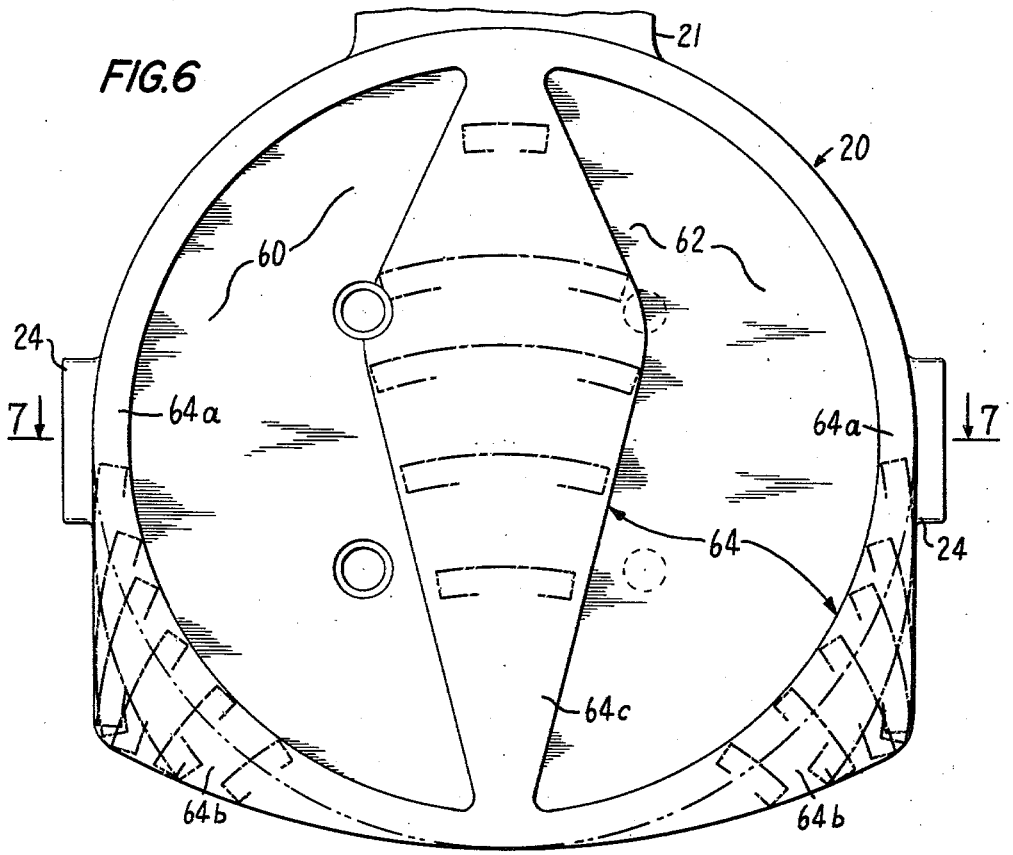
FIGURE 6 illustrates another embodiment of the valve disc according to the present invention.

In FIGURE 6 is illustrated an alternate type of valve disc contact surface. The exterior shape of the disc is similar to that of FIGURE 3, however, the configuration of the contact surface is different. Opposed to the single recessed portion 50 in FIGURE 3, the embodiment of FIGURE 6 includes a pair of similar, but opposite, recessed portions 60, 62 disposed within an annular bearing portion 64a. As in the embodiment of FIGURE 3, additional portions exterior of the annular portion 64a are provided in the form of ears or extensions 64b.

Figure 7:
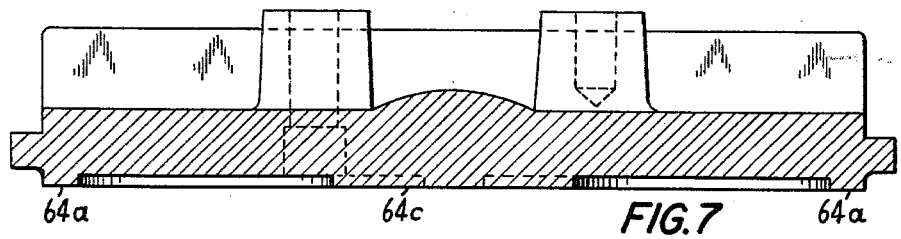
FIGURE 7 is a cross-sectional view through the valve disc of FIGURE 6 taken along the lines 7—7 thereof.

The interior additional portion of the modification of FIGURE 6, however, comprises an elongated segment 64c disposed diametrically across the annular portion 64a in the direction of movement of the disc. As shown, this interior portion 64c is contiguous with the annular portions 64a at both ends and is generally of diamond shape, although other configurations may be used. The shape and dimension of the interior portions 64c may be developed in accordance with the same principles discussed with respect to FIGURE 3, with the realization that the intercept on the interior portion 64c is of such dimensions as to insure that in all positions of the valve disc, equal contact areas are provided on either side of the axis of the disc and of center of gravity of the area of obstruction. As shown in the cross-sectional view of FIGURE 7, the central area 64c is in the same plane as the annular portions 64a and ears 64b.

Returning now to FIGURES 1 and 2, the above described valve discs are shown in a valve having its gate structure enclosed within a housing comprising a body portion 10 and a bonnet portion 12, having abutting flanges and held together by means such as bolts or the like (not shown). The housing, which may be rectangular or elliptical in cross section transverse to its length, includes strengthening ribs 14 formed on the interior surface thereof and a pair of longitudinal rails 18 along which the gate structure, to be described in detail hereinafter, moves.

The gate structure of the valve includes a pair of similar valve discs 20, each provided with four raised bosses 22 on its interior or back face in which bores are provided to accommodate bolts for holding the discs firmly together. The bores 25 may be made completely through the disc and counterbored to accept the head end of the bolts, while bores 23 may be blind ended and tapped to receive the threaded ends of the bolts inserted through the bores 25 of the associated disc.

The upper end of each of the discs is provided with an extension 21 and a stop portion 27, defining therebetween a cavity 23 for the reception of the stem means to be described. A reinforcing rib 26 extends transversely across the back face of each of the discs 20. Each of the valve discs 20 is also provided with a pair of oppositely disposed ears 24 which serve to guide the discs along the rails 18 and align them transversely to the direction of movement.

As shown in FIGURE 2, the valve body portion 10 includes a pair of oppositely disposed flange openings 30 defining a fluid flow path through the valve. Interiorly of the housing, each of the openings 30 is provided with an annular valve seat 32, threadedly engaging the housing for ready replacement. Each of the valve seats 32 includes an annular portion 33 arranged to meet the outer faces of the discs 20 in sealing engagement. The spacing between the outer faces of the discs 20 is such that minimum clearance exists between the discs and the valve seats and sealing engagement is established by fluid flow carrying the disc face on the downstream side of the gate structure against the associated sealing ring.

To move the gate structure in and out of engagement with the valve seats, a stem or shaft 36 is provided having a threaded portion 40 and mating threaded collar 42 at one end thereof. The collar 42 is received within the cavity 23 formed between the extension 21 and the stop portion 27 in the respective valve discs and a sealing ring 38 is formed on the shaft to engage retaining ring 44 with the valve in the open position.

In the type of valve shown in FIGURES 1 and 2, actuation of the gate structure is effected by a piston arrangement wherein the shaft 36 is moved laterally (as indicated by the arrows) by a hydraulically controlled piston arrangement whose movement is controlled to properly align the gate structure and the seats in the closed position of the valve. Valves of this type are well known in the art and details of the piston drive have been omitted for the sake of clarity. A shaft 36 extends beyond the upper end of the bonnet portion 12 through an opening therein provided with suitable packing means 46 and retaining rings 44 and 48. It will be apparent that as the shaft 36 is moved laterally by the piston, the gate structure is moved into and out of engagement with the valve seats 32.

It will be seen from the foregoing that by means of the present invention improved valve operation may be obtained with a decrease in valve disc and seat wear and a consequent saving in replacement costs. Although the invention has been described in connection with a valve of the piston type, it is equally applicable to other types of gate valves in which rotation of a threaded stem (nonrising) operates to open and close the valve.

While the invention has been particularly shown and described with reference to preferred embodiments thereof, it will be understood by those skilled in the art that various changes in form and details may be made therein without departing from the spirit and scope of the invention as defined in the appended claims.

What is claimed is:

1. In a gate valve comprising a valve body having an annular seat encircling a conduit for the passage of fluid, the improvement which comprises a generally flat valve disc having a raised contact face for engagement with said annular seat, said contact face having an annular portion adapted to engage said entire seat in the closed position of the valve and additional portions respectively disposed within and outside of said annular portion, said annular and additional portions being dimensioned and disposed relative to each other such that the pressure between the seat and the contact face caused by the flowing fluid remains substantially constant at a preselected value not more than an allowable maximum value determined by the material of said valve seat and contact face, as said disc is moved between open and closed positions and is substantially uniform over the entire area of contact between said contact face and said seat.

2. A valve disc according to claim 1 wherein said additional portions include at least one elongated segment within said annular portion having its longer dimension extending generally in the direction of movement of said disc, said segment being contiguous with said annular portion over part of its periphery.

3. A valve disc according to claim 1 wherein said additional portions include a pair of elongated segments within said annular portion having their longer dimensions extending generally in the direction of movement of said disc, each of said segments having one elongated edge thereof arcuately conforming to the inner edge of said annular portion and contiguous therewith over its entire length, said segments being disposed on opposite sides of said annular portion with respect to the axis of said disc parallel to its direction of movement.

4. A valve disc according to claim 3 wherein the other elongated edges of said respective segments are substantially straight lines, both ends of each of which intersect the inner edge of said annular portion.

5. A valve disc according to claim 3 wherein said straight line edges of said segments are at equal acute angles to the direction of movement of said disc.

6. A valve disc according to claim 1 wherein said additional portions include an elongated segment within said annular portion extending substantially diametrically thereacross in the direction of movement of said disc.

7. A valve disc according to claim 6 wherein said elongated segment is contiguous with said annular portion at both ends thereof.

8. A valve disc according to claim 7 wherein said elongated segment is generally diamond-shaped.

9. In a gate valve comprising a valve body having an annular seat encircling a conduit for the passage of fluid, the improvement which comprises a generally flat valve disc having a raised contact face for engagement with said annular seat, said contact face having an annular portion adapted to engage said entire seat in the closed position of the valve and additional portions respectively disposed within and outside of said annular portion, said annular and additional portions being dimensioned and disposed relative to each other such that the pressure between the seat and the contact face caused by the flowing fluid remains substantially constant at a preselected value not more than an allowable maximum value determined by the material of said valve seat and contact face, as said disc is moved between open and closed positions and is substantially uniform over the entire area of contact between said contact face and said seat, said contact area being substantially equally divided on either side of the axis of said disc parallel to its direction of movement and substantially equally disposed on either side of a line perpendicular to said axis through the center of gravity of the area of the seat opening intercepted by the valve disc.

References Cited by the Examiner

FOREIGN PATENTS 229,086 1925 Great Britain.

M. CARY NELSON, *Primary Examiner.*

ISADOR WEIL, *Examiner.*